United States Patent
Thrimawithana

(10) Patent No.: US 11,587,260 B2
(45) Date of Patent: Feb. 21, 2023

(54) METHOD AND APPARATUS FOR IN-FIELD STEREO CALIBRATION

(71) Applicant: ZEBRA TECHNOLOGIES CORPORATION, Lincolnshire, IL (US)

(72) Inventor: Raveen T. Thrimawithana, Pannipitiya (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/063,308

(22) Filed: Oct. 5, 2020

(65) Prior Publication Data

US 2022/0109819 A1   Apr. 7, 2022

(51) Int. Cl.
   *G06T 7/80*     (2017.01)
   *G06T 7/521*    (2017.01)
   *G06T 7/593*    (2017.01)

(52) U.S. Cl.
   CPC ............ *G06T 7/85* (2017.01); *G06T 7/521* (2017.01); *G06T 7/593* (2017.01); *G06T 2207/10012* (2013.01); *G06T 2207/10028* (2013.01)

(58) Field of Classification Search
   CPC ........... G06T 7/85; G06T 7/521; G06T 7/593; G06T 2207/10012; G06T 2207/10021; G06T 7/80; H04N 13/246
   See application file for complete search history.

(56) References Cited

U.S. PATENT DOCUMENTS

| 2004/0133376 | A1  | 7/2004  | UffenKamp et al. |
| 2011/0018973 | A1* | 1/2011  | Takayama ........ H04N 5/232121 348/47 |
| 2014/0334745 | A1  | 11/2014 | Fleischer et al. |

(Continued)

FOREIGN PATENT DOCUMENTS

| CN | 107093195 A  | * | 8/2017 | ............ G01C 3/00 |
| CN | 108012143 A  | * | 5/2018 | ............ G01B 11/22 |
| EP | 1376051 A1   | * | 1/2004 | ............ G01B 11/00 |

OTHER PUBLICATIONS

Muhovič, Jon, and Janez Perš. "Correcting Decalibration of Stereo Cameras in Self-Driving Vehicles." Sensors (Basel, Switzerland) 20.11 (2020). (Year: 2020).*

(Continued)

*Primary Examiner* — Geoffrey E Summers

(57) ABSTRACT

A stereo camera calibration method includes: controlling a stereo camera assembly to capture a sequence of stereo image pairs; simultaneously with each capture in the sequence, activating a rangefinder; responsive to each capture in the sequence, updating calibration data for point cloud generation by: detecting matching features in the stereo image pair, and updating a first portion of the calibration data based on the matched features; updating an alignment of the rangefinder relative to the stereo camera assembly, based on the updated first portion of the calibration data, and a detected position of a beam of the rangefinder in a first image of the stereo image pair; and updating a second portion of the calibration data based on the detected position of the beam of the rangefinder in the first image of the stereo image pair, the updated rangefinder alignment, and a depth measurement captured by the rangefinder.

10 Claims, 10 Drawing Sheets

(56) References Cited

U.S. PATENT DOCUMENTS

| | | | |
|---|---|---|---|
| 2016/0227193 A1* | 8/2016 | Osterwood | B25J 9/1697 |
| 2016/0353083 A1* | 12/2016 | Aoki | G06T 7/85 |
| 2016/0376061 A1 | 12/2016 | Shirley et al. | |
| 2018/0249142 A1* | 8/2018 | Hicks | H04N 17/002 |
| 2020/0074684 A1* | 3/2020 | Lin | G06T 7/85 |
| 2021/0293942 A1* | 9/2021 | Kawasaki | G01S 17/86 |

OTHER PUBLICATIONS

Morat, Julien, et al. "Evaluation method for automotive stereo-vision systems." 2007 IEEE Intelligent Vehicles Symposium. IEEE, 2007. (Year: 2007).*

Khurana, Archana, and K. S. Nagla. "Improved auto-extrinsic calibration between stereo vision camera and laser range finder." (2020). (Year: 2020).*

Hartley, Richard, and Andrew Zisserman. Multiple View Geometry in Computer Vision. 2004, Cambridge University Press, 2nd ed. (Year: 2004).*

International Search Report and Written Opinion for International Application No. PCT/US2021/053348 dated Jan. 12, 2022.

* cited by examiner

METHOD AND APPARATUS FOR IN-FIELD STEREO CALIBRATION

BACKGROUND

Stereo imaging may be employed to generate point clouds, dimension objects, and the like. Stereo imaging hardware may be deployed on mobile computing devices, e.g. to enable mobile dimensioning of objects such as packages in warehouses or other facilities. However, the accuracy of information generated from stereo images, such as object dimensions, may be negatively affected by miscalibration of the imaging hardware.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
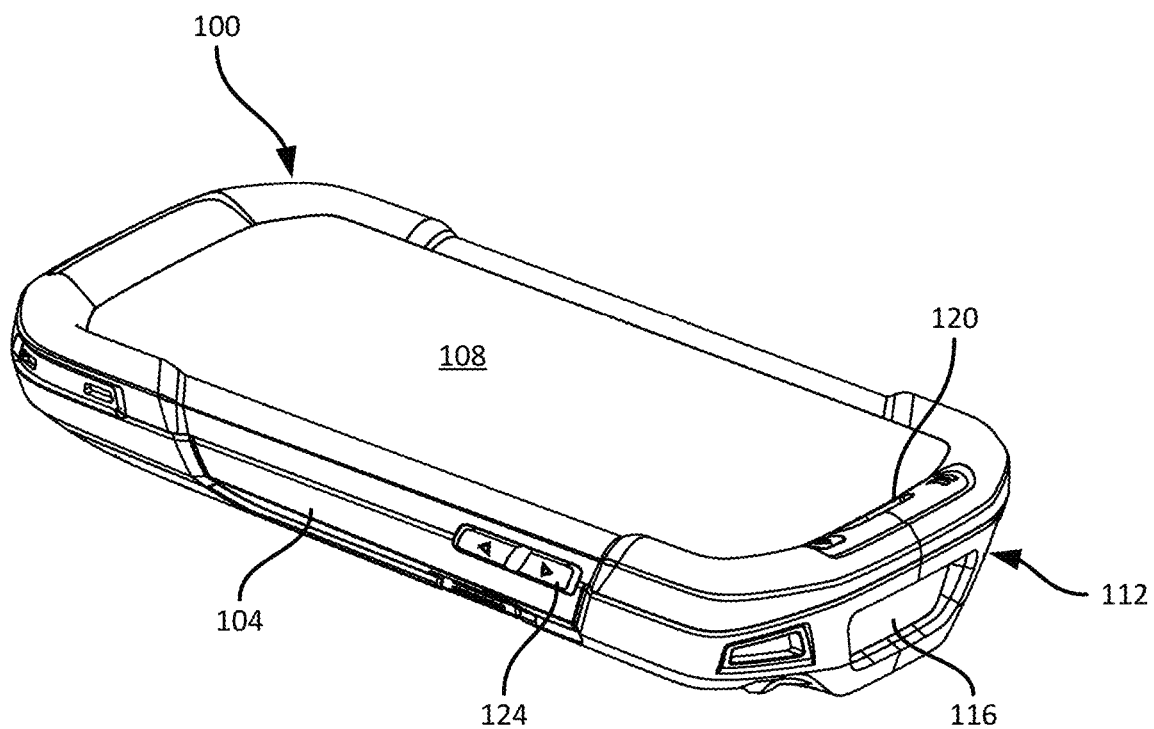
FIG. 1 is a diagram illustrating a mobile computing device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a stereo camera calibration method including: controlling a stereo camera assembly to capture a sequence of stereo image pairs; simultaneously with each capture in the sequence, activating a rangefinder; responsive to each capture in the sequence, updating calibration data for point cloud generation by: detecting matching features in the stereo image pair, and updating a first portion of the calibration data based on the matched features; updating an alignment of the rangefinder relative to the stereo camera assembly, based on (i) the updated first portion of the calibration data and (ii) a detected position of a beam of the rangefinder in a first image of the stereo image pair; and updating a second portion of the calibration data based on (i) the detected position of the beam of the rangefinder in the first image of the stereo image pair, (ii) the updated rangefinder alignment, and (iii) a depth measurement captured by the rangefinder.

Additional examples disclosed herein are directed to a method of updating a first portion of stereo camera assembly calibration data, the method comprising: controlling a stereo camera assembly to capture a sequence of stereo image pairs; determining candidate extrinsics from the matched features; using the candidate extrinsics to transform the stereo image pair and a preceding subset of stereo image pairs in the sequence; detecting further matched features in each of the transformed stereo image pair and the transformed preceding subset of stereo image pairs; determining a combined error metric for the detected further matched features; and when the combined error metric is smaller than a previous combined error metric, setting the candidate extrinsic parameters as current extrinsic parameters.

Further examples disclosed herein are directed to a method of updating an alignment of a rangefinder relative to a stereo camera assembly, the method comprising: controlling a stereo camera assembly to capture a sequence of stereo image pairs; simultaneously with each capture in the sequence, activating a rangefinder; detecting a position of a beam of the rangefinder in a first image of the stereo image pair; obtaining a three-dimensional position of the detected rangefinder beam; retrieving respective three-dimensional positions for preceding rangefinder beams detected in a preceding subset of the sequence of stereo image pairs; and fitting a line to the three-dimensional position and the preceding three-dimensional positions; and determining a three-dimensional position of the rangefinder based on the fitted line.

Still further examples disclosed herein are directed to a method of updating a second portion of stereo camera assembly calibration data, the method comprising: controlling a stereo camera assembly to capture a sequence of stereo image pairs; simultaneously with each capture in the sequence, activating a rangefinder to obtain a depth measurement; detecting a position of a beam of the rangefinder in a first image of the stereo image pair; obtaining an observed depth corresponding to the detected position of the rangefinder beam; obtaining an actual depth of the detected position of the rangefinder beam based on the depth measurement; and determining a ratio of the actual depth to the observed depth.

FIG. 1 illustrates a mobile computing device 100 (also referred to herein as the mobile device 100 or simply the device 100) that is enabled to capture stereo image pairs with a stereo imaging assembly discussed in greater detail below. The stereo image pairs may be processed, for example to generate point clouds representing the scenes captured in the image pairs. Such point clouds may be further processed to identify objects and determine dimensions of the objects. Examples of such objects include packages in a transport and logistics facility, or the like.

The device 100 includes a housing 104 supporting various other components of the device 100. Among the components supported by the housing 104 are a display 108 that, in the illustrated example, also includes an integrated touch screen. The housing 104 can also support a data capture module 112, such as a barcode scanner with a scan window 116 through which the module 112 can capture images and/or emit laser beams to detect and decode indicia such as barcodes affixed to objects within the above-mentioned facility.

The device 100 can also include other devices in addition to the display 108, such as a speaker 120. The device 100 can also include further output devices, such as a haptic output device, an indicator light, and the like. The device 100 can also include input devices in addition to the above-mentioned touch screen, including any one or more of a microphone, at least one button, a trigger, and the like. Such input devices are indicated as an input assembly 124 in FIG. 1 (including buttons on a side of the housing 104).

Figure 2:
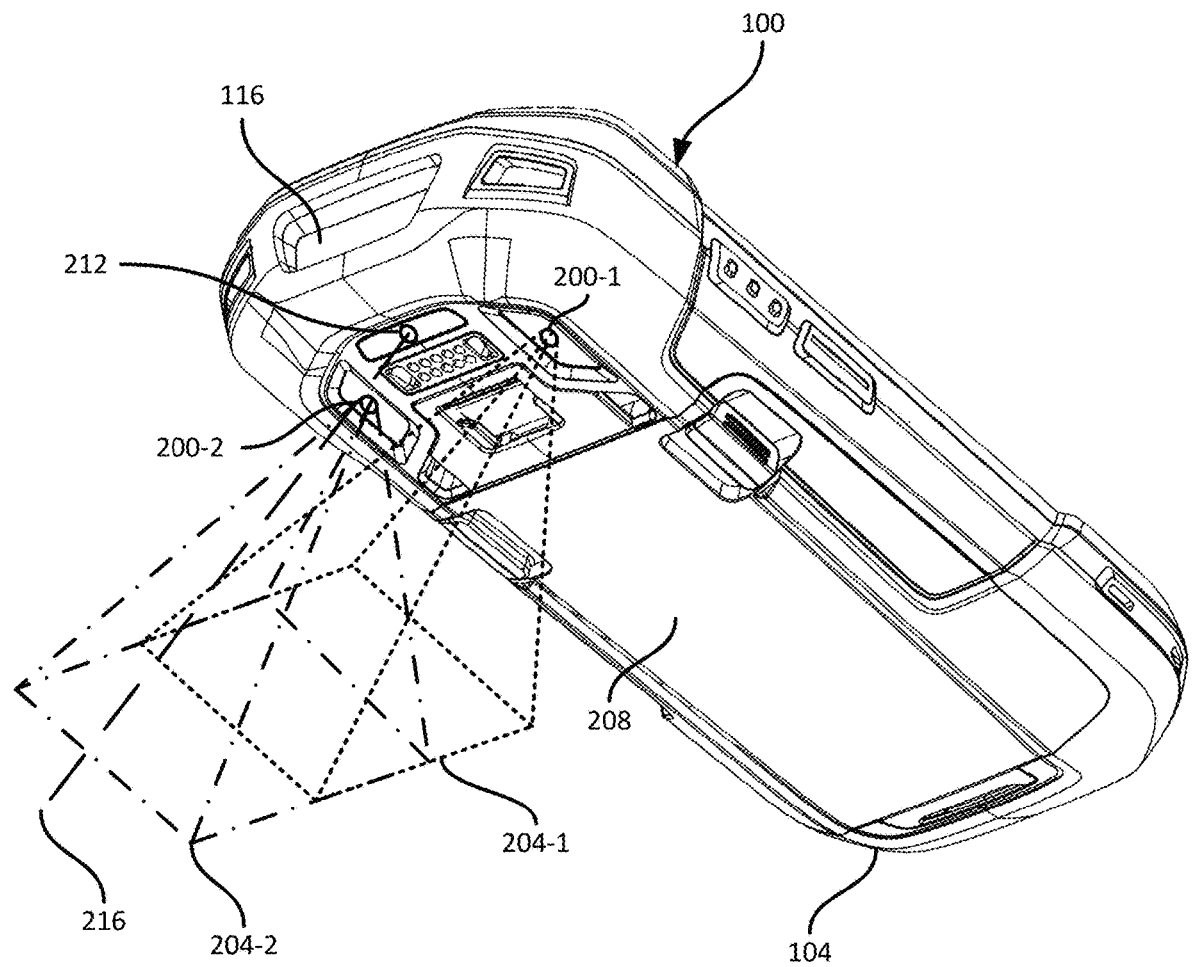
FIG. 2 is a diagram illustrating a rear view of the mobile computing device of FIG. 1.

Turning to FIG. 2, which illustrates a rear view of the device 100, the device 100 also includes a stereo camera assembly. The stereo camera assembly includes a first camera 200-1 and a second camera 200-2, spaced apart on the housing 104 of the device 100. The cameras 200 each include a suitable image sensor or combination of image sensors, optical components (e.g. lenses) and the like. The cameras 200 have respective fields of view (FOV) 204-1 and 204-2 extending away from a back surface 208 of the device 100 (opposite the display 108). The FOVs 204, in the illustrated example, are substantially perpendicular to the back surface 208.

The FOVs 204 overlap, as illustrated in FIG. 2, enabling the device 100 to determine information such as object dimensions for any objects that appear in both FOVs 204. In particular, three-dimensional positions can be determined for portions of the captured environment that appear in both images of a stereo image pair, such that those portions are represented in the above-mentioned point clouds. The degree of overlap between the FOVs 204 shown in FIG. 2 is purely for illustrative purposes. In other examples, the FOVs 204 may overlap to a greater or smaller degree than illustrated.

A stereo pair of images is captured by simultaneously controlling each of the cameras 200 to capture an image. By identifying matching features between the pair of images, the positions of those features in three-dimensional space can be determined based on the positions of the features within the images (e.g. the pixel coordinates of the features), as well as on calibration data.

The calibration data referred to above includes data defining the physical positions of the cameras 200 relative to one another, as well as certain attributes of each camera. For example, the calibration data may include extrinsic parameters for each camera. Extrinsic parameters may include one or more matrices defining the relationship between world coordinates (i.e. positions in three-dimensional space external to the device 100) and camera coordinates (i.e. three-dimensional positions centered on the lens of a given camera 200). As will be apparent, therefore, the extrinsic parameters for the cameras 200-1 and 200-2 also define the relative positions of the cameras 200 to each other.

The calibration data may also include intrinsic parameters of each camera 200, such as the focal length of the camera 200. Intrinsic parameters enable the mapping of pixel coordinates from an image to the above-mentioned camera coordinates, although the mapping of a set of pixel coordinates to camera coordinates with accurate depth (i.e. distance from the camera lens) requires that the image feature being mapped also appear in an image from the other camera 200. Specifically, presuming a given feature in an image from one camera 200 also appears in the image from the other camera, the depth for that feature can be determined using the focal length of the camera 200, the distance between the cameras 200 (also referred to as the baseline, determined by the above-mentioned extrinsics), and the disparity in image coordinates for that feature between the two cameras 200. Specifically, the depth is equal to f×b/d, where f is focal length, b is baseline, and d is disparity.

As will be apparent to those skilled in the art, the three-dimensional positions determined for image features appearing in both images of a stereo image pair may be inaccurate if the calibration data does not accurately reflect the true positions of the cameras 200 relative to one another, and/or if perturbations to the optical components of a camera 200 alter the focal length of that camera 200. In such situations, the stereo imaging assembly is miscalibrated, and may not produce sufficiently accurate point cloud data.

In general, miscalibration includes any variance between the actual positions of the components of the stereo imaging assembly and the expected (i.e. reference) positions of such components. Miscalibration may result from thermal expansion or contraction, which an lead to shifting of components such as lenses, portions of the device housing, and the like. Miscalibration may also be caused by drops or other impacts to the device 100. Because determining information such as object dimensions from stereo images employs the above-mentioned reference positions of imaging components, changes to component positions can lead to inaccurate results.

Calibration of a stereo imaging assembly may, in some implementations, require the capture of images of a reference object, such as a poster bearing a checkerboard pattern with known dimensions. From the known dimensions of the checkerboard features, updated extrinsic and/or intrinsic parameters may be determined and stored for future use. However, the use of a reference object may require interruption to the regular operation of the device 100 (e.g. for dimensioning objects), as the reference object may be available only in certain locations of a facility. Further, calibration using a reference object may be delayed until an operator of the device 100 notices degraded performance by the device 100, and thus some of the results generated previously by the device 100 may be inaccurate, although not sufficiently so as to be noticeable to a human operator.

The device 100 therefore implements functionality to determine updated calibration data during regular use (i.e. in-field calibration, or online calibration), avoiding the need for down time to travel to a location having a reference object.

Certain portions of the above-mentioned online calibration functionality are implemented with a rangefinder 212 disposed on the rear surface 208 of the device 100 (e.g. on the same plane as the cameras 200). The rangefinder 212 can be controlled to emit a beam 216 (e.g. a laser beam) and determine, from reflections of the laser beam, a distance between the rangefinder 212 itself and the object on which the beam 216 reflected.

To use rangefinder measurements to calibrate the stereo imaging assembly, the relative position of the rangefinder 212 to the cameras 200 is maintained as additional calibration data. The alignment of the rangefinder 212 may be perturbed by similar factors to those mentioned above (e.g. physical shock or other environmental effects). The device 100 therefore also implements certain functionality to update the alignment of the rangefinder 212 relative to the cameras 200.

Before further discussing the functionality implemented by the device 100, certain components of the device 100 will be described, with reference to FIG. 3.

Figure 3:
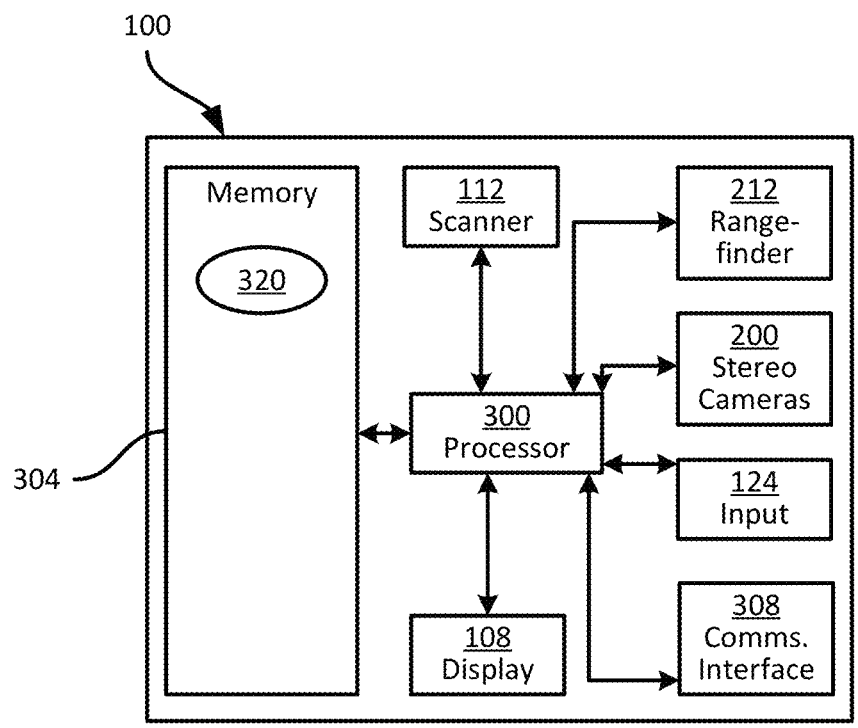
FIG. 3 is a block diagram of certain internal components of the mobile computing device of FIG. 1.

Referring to FIG. 3, a block diagram of certain components of the device 100 is illustrated. In addition to the display (and integrated touch screen, in this example) 108, the data capture module 112, input assembly 124, cameras 200, and rangefinder 212, the device 100 includes a special-purpose controller, such as a processor 300, interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The device 100 can also include a communications interface 308 enabling the device 100 to exchange data with other computing devices, e.g. via a local or wide-area network.

The memory 304 stores computer readable instructions for execution by the processor 300. In particular, the memory 304 stores a calibration application 320 which, when executed by the processor 300, configures the processor 300 to process stereo pairs of images captured via the cameras 200, as well as measurements from the rangefinder 212, to update calibration data for the cameras 200.

The processor 300, when so configured by execution of the application 320, may also be referred to as a calibration controller, or simply a controller. Those skilled in the art will appreciate that the functionality implemented by the processor 300 via the execution of the application 320 may also be implemented by one or more specially designed hardware and firmware components, such as FPGAs, ASICs and the like in other embodiments.

The memory 304 can also store a plurality of other applications (not shown) for execution by the processor 300. For example, the other applications can include a photogrammetry application executable by the processor 300 to detect packages and determine package dimensions using images captured with the cameras 200.

Figure 4:
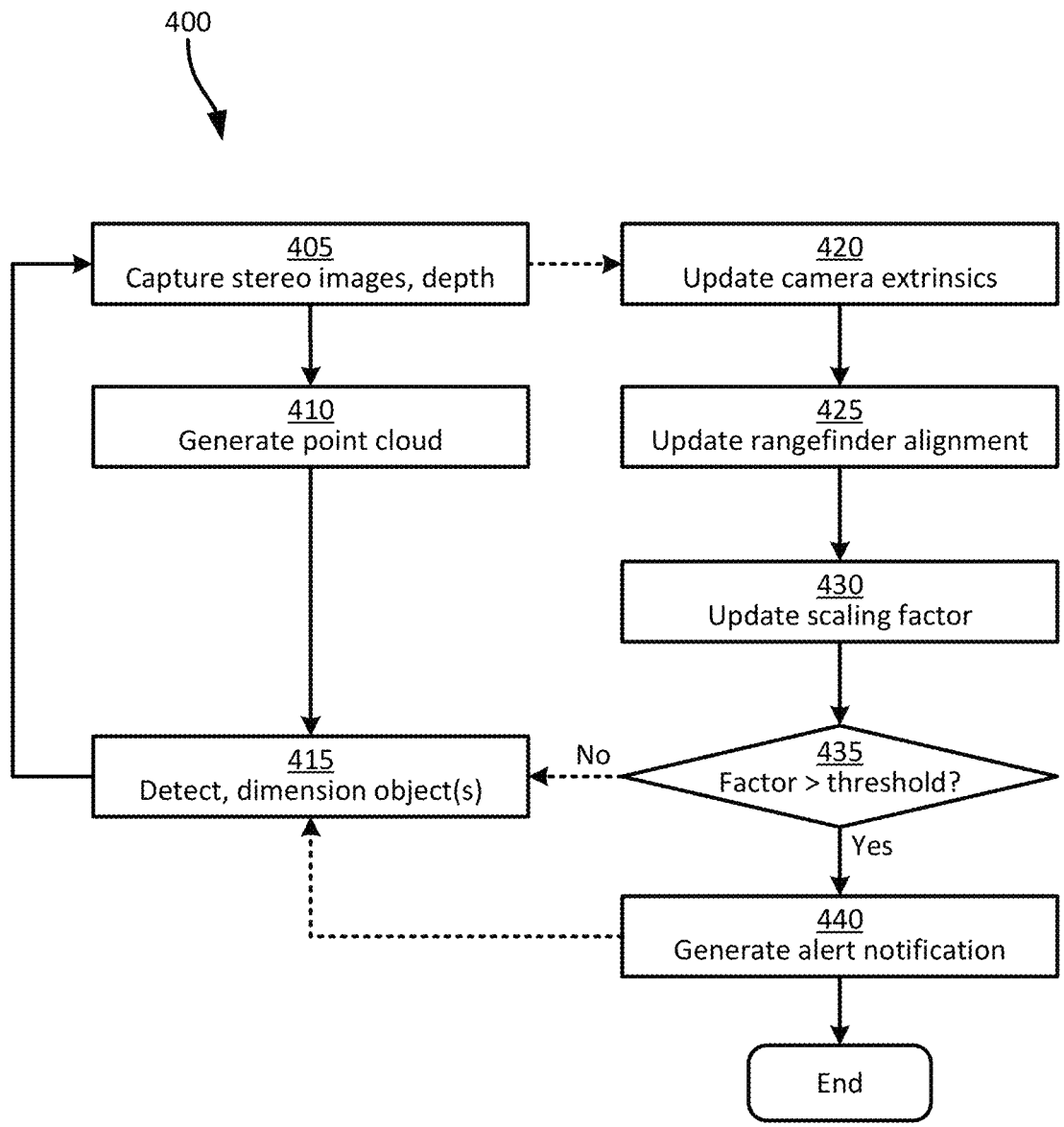
FIG. 4 is a flowchart of a method of in-field stereo calibration.

Turning now to FIG. 4, the functionality implemented by the device 100 will be discussed in greater detail. FIG. 4 illustrates an in-field calibration method 400, which will be discussed below in conjunction with its performance by the device 100.

At block 405, the device 100 is configured to capture a stereo pair of images by controlling the cameras 200. The performance of block 405 may be initiated by activation of an input (e.g. the button shown in FIG. 1) of the device 100 by an operator of the device 100. For example, the initiation of block 405 may occur during regular operation of the device 100, e.g. to dimension one or more objects.

At block 410, the device 100 can be configured to generate a point cloud from the stereo image pair, using current calibration data defining the relative positions of the cameras 200 as well as the internal attributes of each camera 200. Further, at block 415, the device 100 may detect and dimension one or more objects from the point cloud generated at block 410. Object detection may be performed by detecting edges or other features in the point cloud, and applying suitable detection rules dependent on the particular application in which the device 100 is deployed (e.g. size thresholds, and the like).

In parallel with the performance of blocks 410 and 415, the device 100 may also perform a series of calibration actions. That is, the device 100 performs the calibration actions discussed below continuously during use, e.g. for each stereo image pair captured at block 405.

In particular, the calibration activities encompass three subprocesses. At block 420, the device 100 is configured to update a first portion of the calibration data, namely the extrinsic parameters of the cameras 200. Updating of the extrinsic parameters is based on the detection of matching features between images in a plurality of stereo image pairs. The updated extrinsic parameters resulting from the performance of block 420 may not entirely correct calibration errors introduced by physical shock or other environmental effects, but the updated extrinsic parameters are generally sufficient to use as a basis for further correction of calibration data at block 425.

At block 425, the device 100 is configured to update an alignment of the rangefinder 212 relative to the stereo camera assembly, based on the updated extrinsic parameters noted above, and on the detected positions of the beam 216 in a plurality of stereo image pairs. At block 430, the device 100 is configured to update a second portion of the calibration data, in the form of a scaling factor representing a ratio between actual depths (i.e. real distances between a camera 200 and points in a captured environment) and observed depths (i.e. distances between the camera 200 and the above-mentioned points, as determined via the calibration data). Determination of the scaling factor is based on the detected alignment of the rangefinder 212 and on an actual depth obtained from the rangefinder 212, which can be compared to a depth computed from the stereo image pair (which is assumed to be inaccurate under the effects of miscalibration).

The scaling factor, as will be apparent to those skilled in the art, can be applied to the product of the focal length and baseline for a given camera 200, to produce an updated focal length and baseline product for use in determining three-dimensional positions of points in an image from a stereo image pair.

In other words, the performance of block 420 serves to correct certain inaccuracies in the camera extrinsic parameters. The performance of block 425 employs the partially corrected extrinsic parameters, along with detected projections of the beam 216 in captured stereo images, to correct the alignment of the rangefinder 212. Further, the performance of block 430 serves to correct the remaining inaccuracies in the extrinsic parameters via the scaling factor. The above three sub-processes are performed for each instance of block 405. Further, as will be seen below, the output of each sub-process (i.e. each of block 420, block 425, and block 430) depends not only on the current stereo image pair from block 405, but on a number of preceding stereo image pairs and the output of previous instances of blocks 420, 425, and 430.

At block 435, the device 100 can employ the scaling factor as a calibration health indicator. For example, the device 100 can determine whether the scaling factor exceeds a threshold, indicating that the original baseline distance and focal length have been modified sufficiently via the scaling factor that the device 100 may require repair or replacement. When the determination is negative at block 435, the device 100 may proceed with dimensioning or other application-specific functions at block 415. When the determination at block 435 is affirmative, the device 100 may generate a notification at block 440, alerting the operator of the device 100 and/or another computing device that the device 100 may require service.

Figure 5:
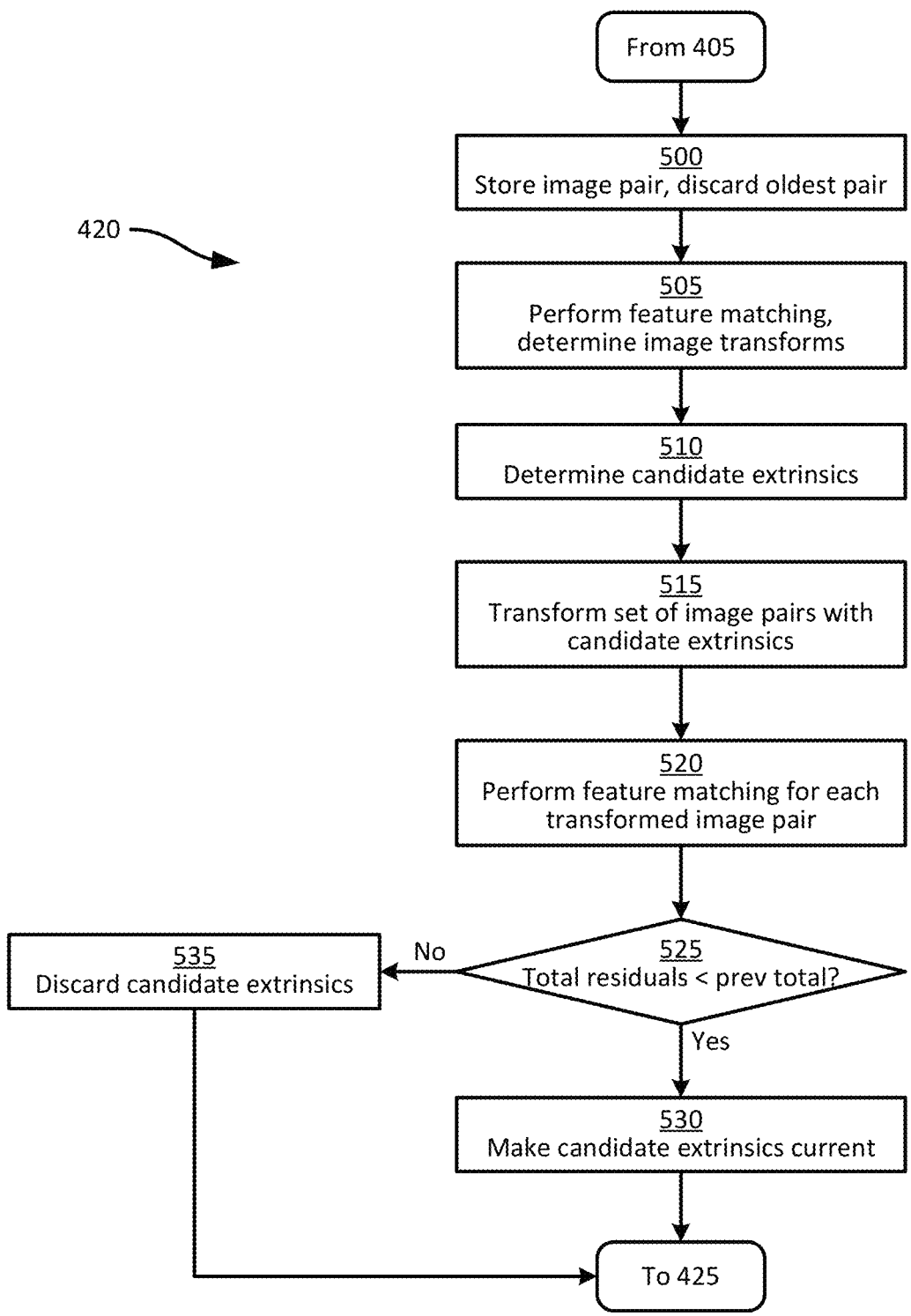
FIG. 5 is a flowchart of a method of performing block 420 of the method of FIG. 4.

Turning now to FIG. 5, the subprocess at block 420 will be described in greater detail. In general, miscalibration due to physical shock, excessive heat or cold, or the like, may shift one or both of the cameras 200 in the housing 104, such that the originally stored extrinsic parameters associated with the cameras 200 are no longer accurate. The process shown in FIG. 5 seeks to at least partially correct the extrinsic parameters.

At block 500, the device 100 is configured to update a set of stored stereo image pairs. For example, the process of FIG. 5 may be performed using a sequence of twenty stereo image pairs (although various other numbers of image pairs may also be employed in other embodiments). Thus, following a performance of block 405, the oldest image pair in the sequence is discarded from the set, and the most recently captured pair is added to the set.

At block 505, the device 100 is configured to identify matched features between the images in the current stereo image pair (i.e. the pair of images captured in the most recent performance of block 405). Features may include edges, corners, gradients, and the like. Feature matching can be performed according to any suitable feature detection mechanism, such as ORB (oriented FAST, rotated BRIEF). In general, the device 100 detects features within one of the image pair that also appear in the other of the image pair. The device 100 is further configured to determine a transform for aligning the images, based on the matched features. For example, the transform can include at least one of a translation and a rotation to place the matched features from each image in the same positions.

Figure 6:
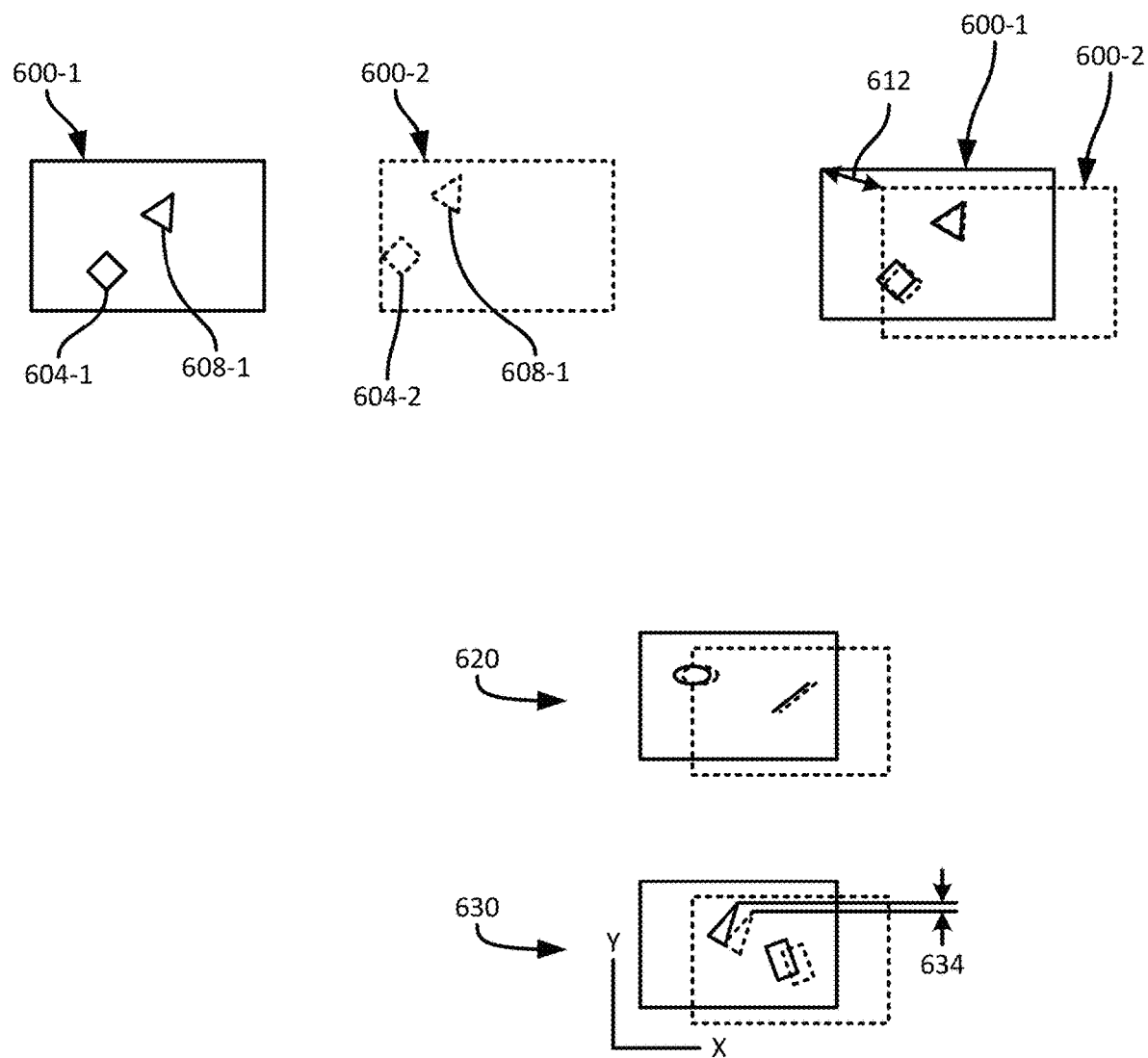
FIG. 6 is a diagram illustrating a performance of the method of FIG. 5.

Turning to FIG. 6, a stereo pair of images 600-1 and 600-2, captured by the cameras 200-1 and 200-2, respectively, are illustrated. Also shown in FIG. 6 are matched features 604 and 608 detected in both images 600 (and thus labelled 604-1 and 604-2, and 608-1 and 608-2). Also shown in FIG. 6 is a transform 612 (represented graphically by a double-ended arrow) determined in order to align the features 604 and 608. As will be apparent, feature detection at block 505 may yield more than the two features illustrated in FIG. 6 (e.g. potentially hundreds of matched features may be detected). The transform function may be determined to align the entire set of features as closely as possible, although some feature pairs may not align perfectly due to image artifacts, limits to the accuracy of feature detection, and the like. Thus, as shown in FIG. 6, when the images 600 are aligned according to the transform 612, the alignment between the features 608 is substantially exact, while the alignment between the features 604 is less exact.

Returning to FIG. 5, at block 510 the device 100 is configured to determine, from the transform 612, candidate extrinsic parameters for at least one of the cameras 200. For example, the device 100 may adjust the extrinsic parameters of the camera 200-1 while leaving the extrinsic parameters of the camera 200-2 unchanged, or vice versa. In some examples, the extrinsic parameters of both cameras 200 may be adjusted to match the transform 612.

At block 515, the device 100 is configured to evaluate the candidate extrinsic parameters (which arise from a single stereo image pair) against the sequence of image pairs mentioned above (i.e. the current image pair and the set of preceding image pairs updated at block 500). In particular, the device 100 is configured, for each of the image pairs in the sequence, to transform the image pair with the candidate extrinsic parameters. At block 520, the device 100 is then configured to perform feature matching for each of the preceding image pairs, as described above in connection with block 505. In some embodiments, previously identified features for the preceding image pairs may be stored, and block 520 may therefore be omitted.

At block 525, the device 100 is configured to determine an error metric from the matched features detected in the sequence of image pairs. For example, the error metric can be the sum of vertical pixel distances between matched features in the transformed image pairs. Turning to FIG. 6, two additional examples of image pairs, 620 and 630, are illustrated following transformation according to the candidate extrinsic parameters. The pair 620 includes an elliptical feature and an edge feature, while the pair 630 includes a triangular feature and a rectangular feature. An example error measurement 634 is shown in connection with the pair 630, in the form of a vertical (i.e. in the Y axis of the images) distance between matched features.

As will now be apparent, horizontal errors (i.e. along the X axis) indicate inaccurate depth perception by the stereo imaging assembly, which is corrected in subsequent subprocesses. Such horizontal errors are therefore ignored at this stage. Vertical errors, however, may be substantially eliminated by the updated extrinsic parameters generated via the subprocess of FIG. 5, and are therefore employed as an indication of the accuracy of the candidate extrinsic parameters.

Specifically, the device 100 is configured to determine the vertical error for each pair of matched features, across the entire set of image pairs. The error metric evaluated at block 525 is the sum of all error measurements from the matched features. When the error metric is smaller than the error metric for the previous performance of block 420 (i.e. arising from the previous candidate extrinsic parameters), the candidate extrinsic parameters are set as the current extrinsic parameters at block 530. When the determination at block 525 is negative, indicating that the error metric is greater than that from the previous iteration of the process of FIG. 5, the candidate extrinsic parameters are discarded (i.e. the current extrinsic parameters are maintained). The device 100 then proceeds to block 425 (i.e. the second subprocess).

In summary, the subprocess of FIG. 5 (i.e. block 420) updates the extrinsic parameters of the cameras 200 such that the images in any given image pair are aligned accurately in the vertical direction, although their horizontal alignment may remain inaccurate.

Referring briefly to FIG. 4, at block 425 the device 100 is configured to update the alignment of the rangefinder 212 relative to the cameras 200. The rangefinder alignment subprocess is illustrated in greater detail in FIG. 7.

At block 700, the device 100 is configured to detect a position of the rangefinder beam 216 in a first image of the image pair captured at block 405. In the present example, the first image is assumed to the image captured by the camera 200-1, but in other embodiments the image captured by the camera 200-2 may be employed instead.

Detection of the beam 216 in the first image can be performed by searching the image for a pixel, or set of adjacent pixels, with a threshold brightness, a predetermined color, or the like, that indicate a projection of the beam 216 on a surface represented in the image.

At block 705, the device 100 is configured to determine whether the surface surrounding the detected position of the beam 216 is planar. For example, the device 100 can retrieve point cloud points for a predetermined radius about the detected beam 216 position, and compute normal vectors for the retrieved points, and/or fit a plane (e.g. via random sample consensus, or RANSAC, plane fitting) to the retrieved points. When the surface is not planar (i.e. the determination at block 705 is negative), the device 100 can skip the adjustment of rangefinder alignment, and proceed instead to block 430. Specifically, if the surface on which a projection of the beam 216 was detected is not sufficiently planar, the detection of the beam projection may not be sufficiently reliable to proceed with updating the rangefinder alignment.

When the determination at block 705 is affirmative, the device 100 proceeds to block 710. At block 710, the device 100 obtains and stores the three-dimensional position of the beam projection, relative to the camera used to capture the image referred to in connection with FIG. 7. The device 100 maintains a set of such three-dimensional positions, e.g. based on images captured in the fifty most recent performances of block 405 (although other set sizes may also be employed). At block 710, the device 100 may therefore also discard the oldest three-dimensional beam position.

At block 715, the device 100 is configured to determine a ray that intersects the rangefinder 212 (specifically, the origin of the rangefinder 212, where the beam 216 is emitted). The ray is determined by fitting a line to the set of three-dimensional positions referred to in connection with block 710, e.g. via regression, RANSAC fitting, or the like.

Figure 7:
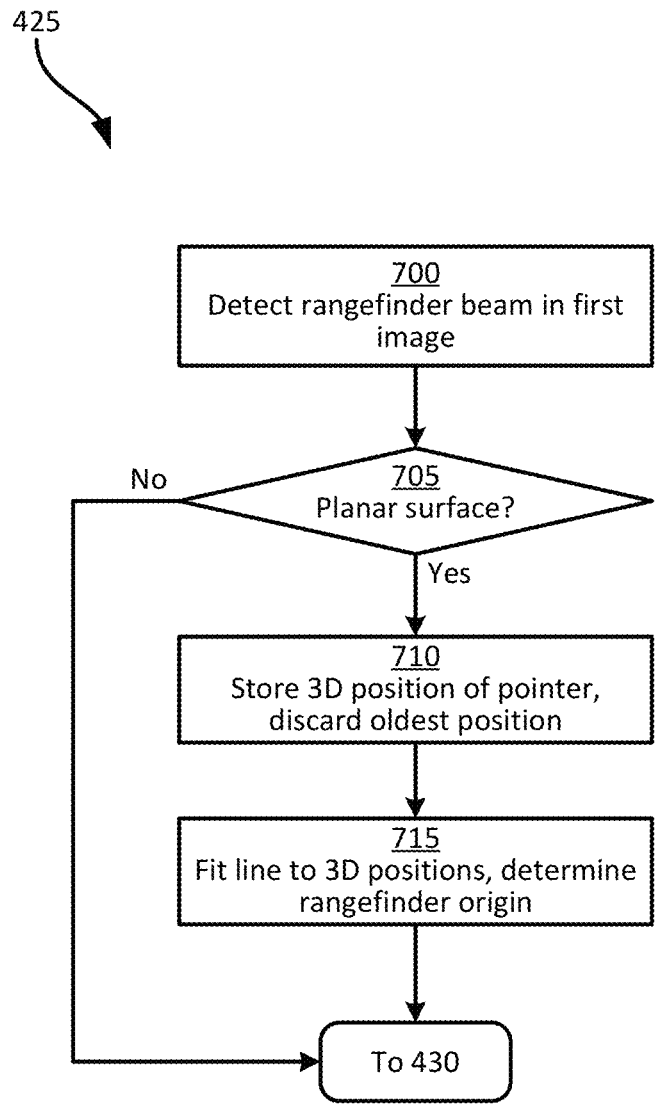
FIG. 7 is a flowchart of a method of performing block 425 of the method of FIG. 4.
Figure 8:
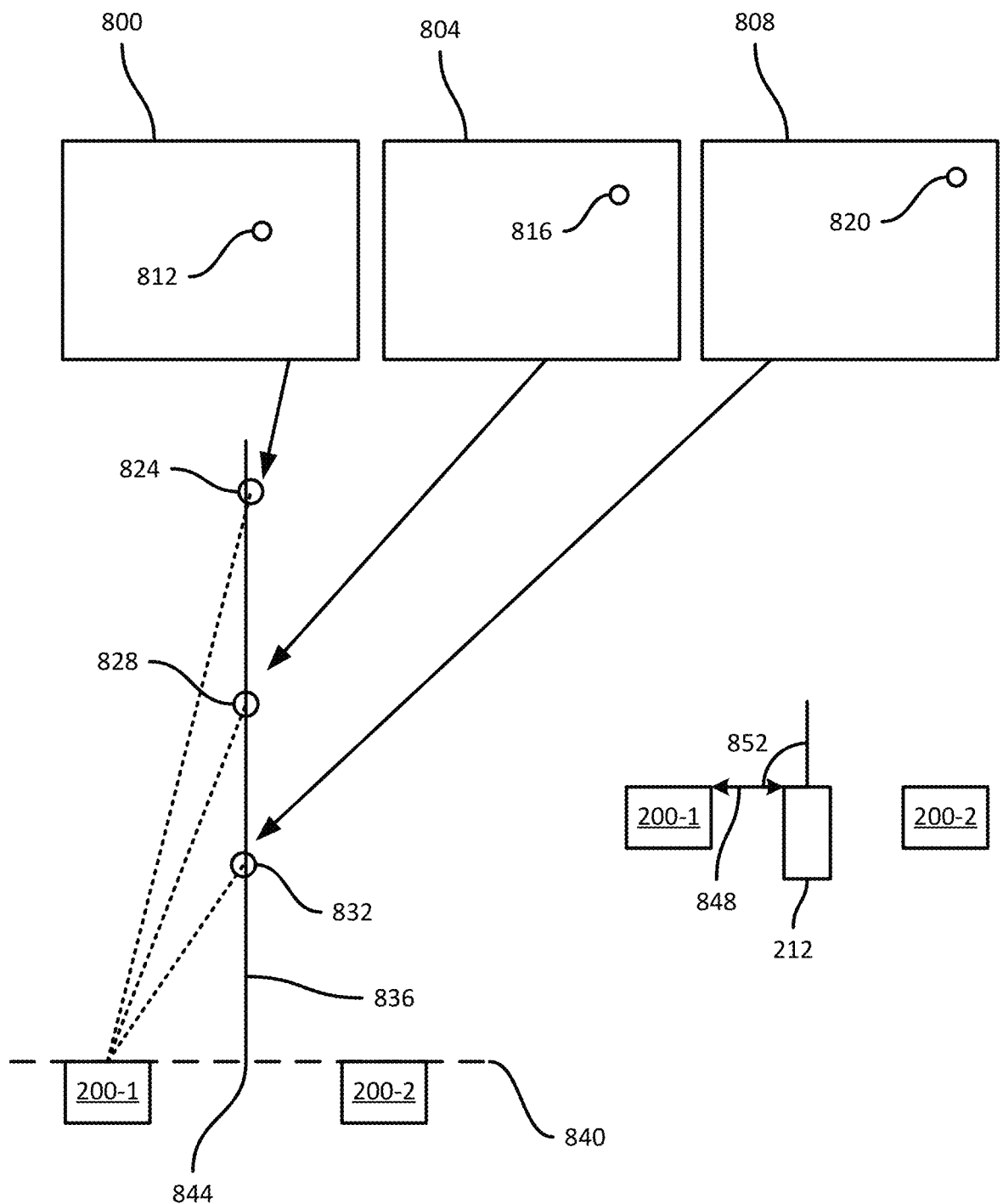
FIG. 8 is a diagram illustrating a performance of the method of FIG. 7.

Turning to FIG. 8, a simplified example of the subprocess of FIG. 7 is illustrated. In particular, three example images from the camera 200-1 are shown, including a current image 800, and two preceding images 804 and 808. In each image, respective projections 812, 816, and 820 of the beam 216 have been detected. It is assumed, in this example, that the surfaces surrounding the projections 812, 816, and 820 are planar, and the determination at block 705 is therefore affirmative for each projection. From the image positions (e.g. two-dimensional pixel coordinates) 812, 816, and 820, respective three-dimensional positions 824, 828, and 832 are obtained based on the corresponding stereo image pairs. As will be apparent, the depth of each position 824, 828, and 832 may be inaccurate, and the placement of the positions 824, 828, and 832 along the respective rays from the camera 200-1 (shown in dashed lines) may not reflect the true positions of the beam projections. However, the nature of such depth-based errors is such that the line fitted to the three-dimensional positions nevertheless intersects with the position of the rangefinder 212.

A line 836 fitted to the three-dimensional positions 824, 828, 832 is also illustrated in FIG. 8. To determine the origin of the rangefinder 212, the device 100 is configured to locate the intersection of the line 836 with a plane 840 containing the origins of the cameras 200. Thus, in the illustrated example, the origin 844 of the rangefinder 212 is located. More specifically, the device 100 may identify both a position of the rangefinder 212, represented by a distance 848 from the camera 200-1 to the rangefinder 212 along the plane 840, and an angle of inclination 852 of the beam 216 relative to the plane 840. The angle 852 may also be expressed as an angle between the beam 216 and an optical axis of the camera 200-1 (which is typically at a right angle relative to the plane 840).

Having obtained the updated rangefinder alignment, the device 100 proceeds to block 430. As noted above, at block 430 the device 100 is configured to update a scaling factor, to correct for inaccurate depth perception by the stereo imaging assembly.

Figure 9:
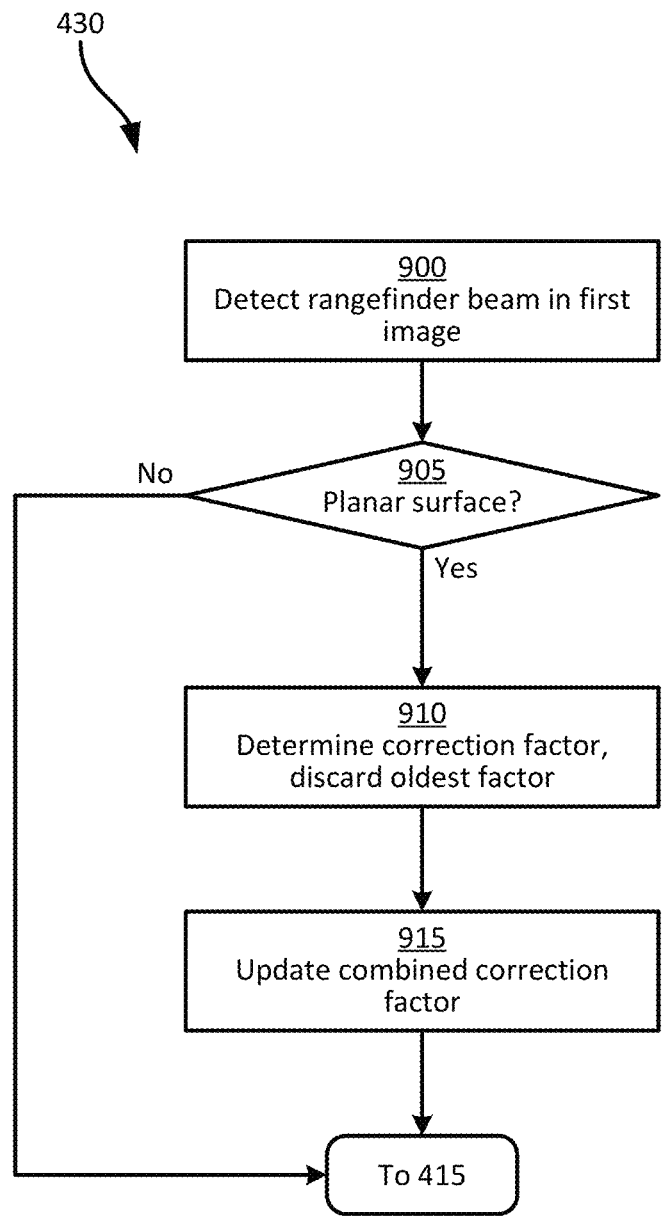
FIG. 9 is a flowchart of a method of performing block 430 of the method of FIG. 4.

Turning to FIG. 9, at block 900 the device 100 is configured to detect the rangefinder beam 216 in a first image of the stereo pair from block 405, as described in connection with block 700. At block 905, the device 100 can determine whether the region surrounding the beam 216 is sufficiently planar, as described in connection with block 705. When the determination at block 905 is negative, the device 100 proceeds directly to block 415, bypassing block 435 (because block 435 depends on a scaling factor, which is not updated following a negative determination at block 905).

As will now be apparent, blocks 900 and 905 need not be performed separately from blocks 700 and 705. Instead, the beam locations from block 700 can also be employed in the subprocess of FIG. 9. Further, when the determination at block 705 is negative, the device 100 can bypass the subprocess of FIG. 9 entirely, and proceed to block 415.

When the determination at block 905 is affirmative, the device 100 is configured to determine a correction factor at block 910, using a depth measurement obtained from the rangefinder 212 at block 405, as well as the rangefinder alignment determined at block 425 (i.e. the subprocess of FIG. 7).

Figure 10:
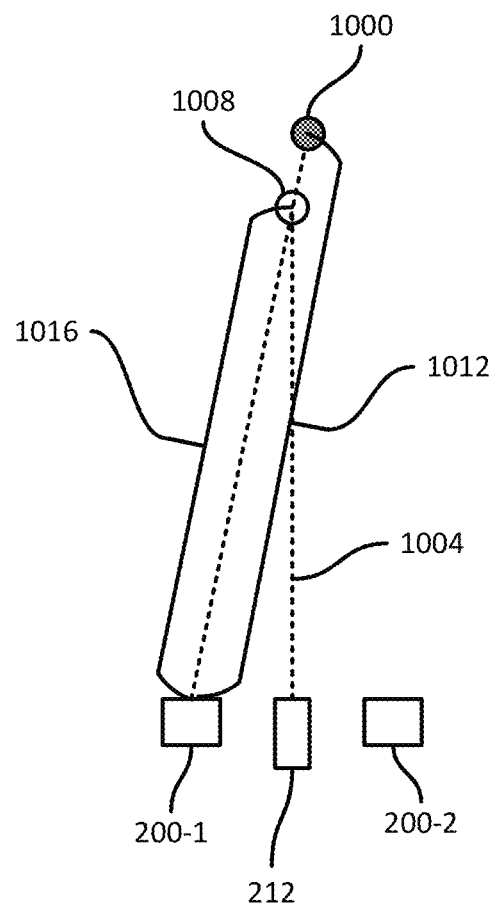
FIG. 10 is a diagram illustrating a performance of the method of FIG. 9.

Determination of a correction factor is illustrated at FIG. 10. In particular, FIG. 10 illustrates a three-dimensional position 1000 of a projection of the beam 216 detected in an image from the camera 200-1. FIG. 10 also illustrates a depth measurement 1004 captured by the rangefinder 212. The depth measurement 1004 represents the distance from the rangefinder 212 to the actual position 1008 of the beam projection. As will now be apparent, although the actual position 1008 and the detected position 1000 are on the same ray from the camera 200-1, the depth of the detected position 1000 is inaccurate as a result of miscalibration of the cameras 200.

The device 100 is configured to determine the correction factor by computing the depth 1012 of the three-dimensional position 1000, as well as the depth 1016, relative to the camera 200-1, of the actual position 1008. The depth 1016 is determined based on the measured depth 1004 from the rangefinder 212, and on the rangefinder alignment (e.g. the distance 848 and angle 852 mentioned earlier). The correction factor is the ratio of the depth 1016 to the depth 1012.

Returning to FIG. 9, having determined the correction factor, the device 100 is configured to store the correction factor and discard an oldest one of a set of correction factors. As with the subprocesses discussed above, the device 100 is configured to store the output of block 430 for a sequence of stereo image pair captures (e.g. thirty captures, although other set sizes may also be employed).

Returning to FIG. 9, at block 915, the device 100 is configured to update a combined correction factor, based on the correction factor determined at block 910 and a set of preceding correction factors. For example, the device 100 can determine an average of the stored set of correction factors.

Once the combined correction factor is determined, the device 100 can proceed to block 435 as described earlier. Further, the subsequent performance of block 410 (i.e. generation of a point cloud) is implemented using the updated calibration data, including either or both of the updated extrinsic parameters from block 420 and the combined correction factor from block 430.

Variations to the above are contemplated. For example, while the device is described above as performing the calibration process continuously during data capture, in other examples, the device 100 may initiate the performance of blocks 420 to 440 only following detection of a disruption that may cause miscalibration. For example, the device 100 can include one or more environmental sensors, such as a temperature sensor, a shock sensor (e.g. an accelerometer), or the like, and the performance of the calibration process can be initiated when at least one environmental condition exceeds a threshold.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A stereo camera calibration method, comprising:
controlling a stereo camera assembly to capture a sequence of stereo image pairs;
simultaneously with each capture in the sequence, activating a rangefinder;
responsive to each capture in the sequence, updating calibration data for point cloud generation by:
  detecting matched features in the stereo image pair, and updating a first portion of the calibration data based on the matched features;
  updating an alignment of the rangefinder relative to the stereo camera assembly, based on (i) the updated first portion of the calibration data, and (ii) a detected position of a beam of the rangefinder in a first image of the stereo image pair; and
  updating a second portion of the calibration data based on (i) the detected position of the beam of the rangefinder in the first image of the stereo image pair, (ii) the updated rangefinder alignment, and (iii) a depth measurement captured by the rangefinder,
wherein updating the alignment of the rangefinder includes:
  obtaining a three-dimensional position of the detected rangefinder beam, based on the detected position of the rangefinder beam in the first image,
  retrieving respective three-dimensional positions for preceding rangefinder beams detected in a preceding subset of the sequence of stereo image pairs,
  fitting a line to the three-dimensional position and the preceding three-dimensional positions, and
  determining a three-dimensional position of the rangefinder based on the fitted line.

2. The method of claim 1, further comprising:
controlling the stereo camera assembly to capture a further stereo image pair;
generating a point cloud from the further stereo image pair, based on at least the updated second portion of calibration data; and
dimensioning an object based on the point cloud.

3. The method of claim 1, wherein the first portion of the calibration data includes extrinsic parameters of the stereo camera assembly.

4. The method of claim 3, wherein updating the first portion of the calibration data includes:
   determining candidate extrinsic parameters from the matched features;
   transforming, using the candidate extrinsic parameters, the stereo image pair and a preceding subset of stereo image pairs in the sequence;
   detecting further matched features in each of the transformed stereo image pair and the transformed preceding subset of stereo image pairs;
   determining a combined error metric for the detected further matched features; and
   when the combined error metric is smaller than a previous combined error metric, setting the candidate extrinsic parameters as current extrinsic parameters.

5. The method of claim 4, wherein the combined error metric includes a sum of distances in a first dimension between respective pairs of the further matched features.

6. The method of claim 1, further comprising:
   prior to updating the alignment of the rangefinder, determining that a region surrounding the detected position of the rangefinder beam in the first image is planar.

7. The method of claim 1, wherein the second portion of the calibration data includes a scaling factor defining a ratio between (i) an actual depth corresponding to the detected position of the rangefinder beam, and (ii) an observed depth corresponding to the detected position of the rangefinder beam.

8. The method of claim 7, wherein updating the second portion of the calibration data includes:
   obtaining the observed depth corresponding to the detected position of the rangefinder beam, based on the first portion of the calibration data;
   obtaining the actual depth of the detected position of the rangefinder beam based on (i) a depth measurement from the rangefinder and (ii) the rangefinder alignment; and
   determining the scaling factor.

9. The method of claim 8, further comprising:
   generating a combined scaling factor from the scaling factor and a set of previously determined scaling factors.

10. The method of claim 1, further comprising:
    prior to updating the second portion of the calibration data, determining that a region surrounding the detected position of the rangefinder beam in the first image is planar.

* * * * *